United States Patent
Kreuzer

(10) Patent No.: US 6,770,826 B2
(45) Date of Patent: Aug. 3, 2004

(54) VEHICLE STEERING WHEEL

(75) Inventor: Martin Kreuzer, Kleinwallstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 10/200,688

(22) Filed: Jul. 22, 2002

(65) Prior Publication Data

US 2003/0024798 A1 Feb. 6, 2003

(30) Foreign Application Priority Data

Aug. 1, 2001 (DE) .................................. 201 12 718 U

(51) Int. Cl.[7] .............................................. H01H 9/00
(52) U.S. Cl. ..................... 200/61.54; 200/4; 200/17 R; 280/728.2
(58) Field of Search ........................ 200/61.54, 61.55, 200/61.57, 4, 17 R, 18; 74/552; 280/728.2, 731; 307/10 R

(56) References Cited

U.S. PATENT DOCUMENTS

| | | | | |
|---|---|---|---|---|
| 1,973,831 A | * | 9/1934 | Waggoner | 200/59 |
| 2,237,607 A | * | 4/1941 | Rusche | 200/59 |
| 2,863,015 A | * | 12/1958 | Ahrens | 200/61.54 |
| 4,219,706 A | * | 8/1980 | Koch et al. | 200/4 |
| 4,578,592 A | * | 3/1986 | Nakazawa et al. | 307/10 R |
| 4,590,340 A | * | 5/1986 | Koike et al. | 200/61.54 |
| 6,437,265 B1 | * | 8/2002 | Kreuzer | 200/61.54 |

FOREIGN PATENT DOCUMENTS

| | | |
|---|---|---|
| DE | 19625966 | 1/1998 |
| DE | 10041590 A1 | 4/2001 |
| DE | 20103890 U1 | 8/2001 |
| WO | 0160650 | 8/2001 |

OTHER PUBLICATIONS

Pending U.S. Schutz patent application Ser. No. 10/083,072, filed Feb. 26, 2002 entitled "Vehicle Steering Wheel", Attorney Docket No. TRW(ASG)6051.
European Search Report.

* cited by examiner

*Primary Examiner*—Michael Friedhofer
*Assistant Examiner*—K. Lee
(74) *Attorney, Agent, or Firm*—Tarolli, Sundheim, Covell & Tummino L.L.P.

(57) ABSTRACT

A vehicle steering wheel comprises a steering wheel body and at least one electric switch attached to the steering wheel body. The switch, for adaptation to the length of the fingers of a driver, is adjustably attached to the steering wheel body in such a way that it can be adjusted by the driver to assume various positions relative to the steering wheel body.

16 Claims, 2 Drawing Sheets

VEHICLE STEERING WHEEL

TECHNICAL FIELD

The invention relates to a vehicle steering wheel comprising a steering wheel body and at least one electric switch attached to the steering wheel body.

BACKGROUND OF THE INVENTION

The growing use of electronics in vehicles involves a constantly increasing number of functions which the driver of the vehicle can influence while driving. Aside from adjusting a ventilation or air-conditioning system, these include, for example, the operation of a cell phone or a radio. It is a known procedure to provide additional switches on the steering wheel, for instance, in the area of the airbag module, for performing such functions. Another suitable location for such switches is the spokes of the steering wheel. The arrangement of a switch within reach of the fingers of the driver when his/her hands are on the steering wheel markedly improves driving safety.

The invention serves to make the operation of an above-mentioned switch more comfortable for the driver and thus serves to improve the driving safety.

BRIEF SUMMARY OF THE INVENTION

According to the invention, a vehicle steering wheel comprises a steering wheel body and at least one electric switch attached to the steering wheel body. The switch, for adaptation to the length of the fingers of a driver, is adjustably attached to the steering wheel body in such a way that it can be displaced by the driver to assume various positions relative to the steering wheel body. The term steering wheel body is used here to refer, for example, to the combination of a steering wheel skeleton with a foam covering that partially or completely surrounds this skeleton. The advantage of the invention is that every driver, depending on his/her hand size and finger length, can individually set the position of the switch comfortably so that he/she can operate it easily without being distracted from traffic. Adjustment of the switch is, of course, not aimed at the adjustment into another functional switch position, in which an actuated switch part has a changed distance to the steering wheel, for instance during switching "On" and "Off". The adjustment of the switch or switch part according to the invention is rather independent of the functional switch position and the displacement of the switch or switch part does not amend the switching position. Preferably, the complete preassembled switch, as a unit, is displaced for adaptation to the finger length.

In order to make the adjustment as convenient as possible, the switch is preferably mounted in such a way that the adjustment can be made by the driver without the use of a tool. In this way, the driver can move the switch into a suitable position at any time.

Preferably the switch is accommodated in a linear guide. Advantageously, the steering wheel is designed in such a way that for mounting the switch it can be inserted into the linear guide transversely to the adjustment direction and is then held in the linear guide by being moved subsequently. This design allows a simple installation of the switch on the steering wheel and, at the same time, a reliable guidance of the switch when it is moved.

In a preferred embodiment of the invention, a detachable form-fitting connection is provided, which can be locked in any position of the switch. This form-fitting connection is preferably a toothed structure that meshes with counter teeth on the switch. Teeth allow a fine graduation of the various adjustment positions possible while the mechanism is simple and inexpensive to produce.

In order to actuate the adjustment mechanism, it is preferably provided that the part of the form-fitting connection that is associated with the switch can be moved transversely to the adjustment direction out of a locked position and into a traversing position in which an adjustment of the switch is permissible, the part of the form-fitting connection associated with the switch being subsequently moved into another locked position. The form-fitting connection can be unlocked, for example, in that the driver depresses an adjustment element and moves the switch, the switch being automatically locked in its new position after the adjustment element has been released.

Preferably, the adjustment element is situated on the rear side of the steering wheel and is connected to the switch, so that the switch can be moved by means of the adjustment element.

Preferably, a latching pin that forms the switch-side part of the form-fitting connection is formed on the adjustment element. Moreover, the adjustment element can be connected to the switch via a flexible bearing arm, the latching pin being brought out of the locked position and into the traversing position by bending the bearing arm. This construction is simple, space-saving and inexpensive to produce.

In a preferred embodiment of the invention, the switch is designed as a multi-function keypad. Such a multi-function keypad makes it possible to operate an unlimited number of functions with just a few switching elements.

The production can be even further simplified in that the switch is part of a switching unit configured as a prefabricated assembly having a housing which is rigidly attached to the steering wheel body and in which the switch is movably mounted. The housing can be attached to the steering wheel, for example, by a latching connection so that the assembly merely has to be inserted into the steering wheel body.

The switch can be attached to a spoke of the steering wheel body ergonomically and adapted to the design of the steering wheel and it can be configured to move lengthwise along said spoke.

DETAILED DESCRIPTION OF THE PREFERRED EMBODIMENT

Figure 1:
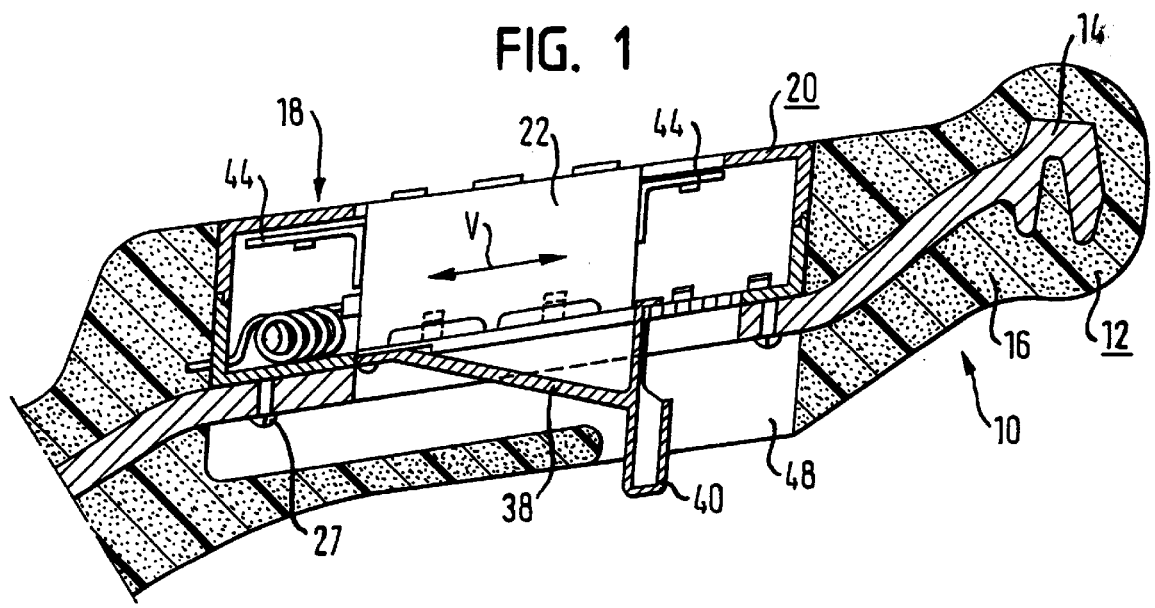
FIG. 1 is a cross-sectional view of a spoke of a steering wheel according to the invention.
Figure 2:
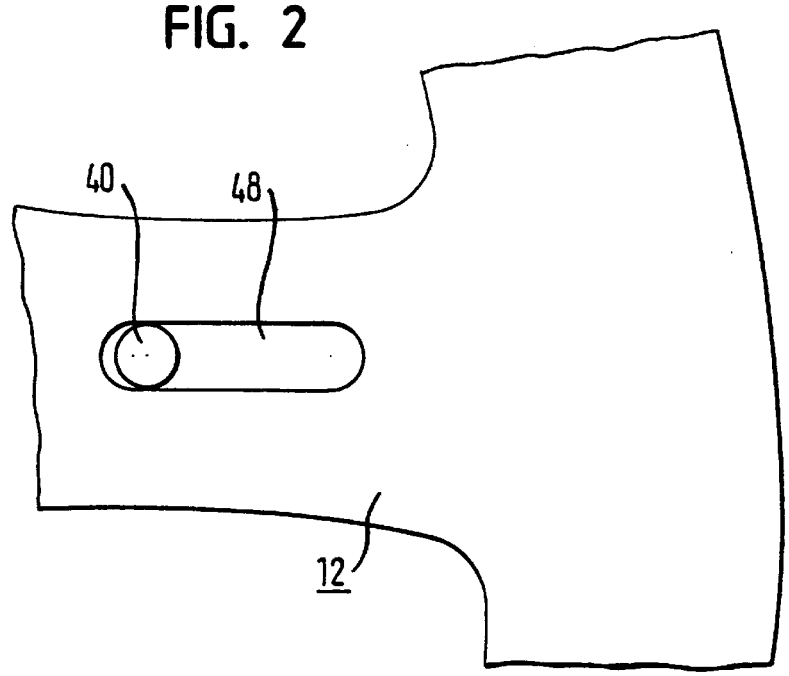
FIG. 2 is a detail of the bottom of a steering wheel according to the invention.

FIG. 1 shows a spoke 10 of a steering wheel. The spoke 10 is part of a steering wheel body 12, in this case comprising a rigid skeleton 14 and a foam covering 16 surrounding the skeleton 14. However, the steering wheel body 12 can also be made in another manner, since its design is not essential to the principle of the invention.

In the spoke 10, a switching unit 18 is integrated, which is configured as an assembly consisting of a housing 20 and a switch 22 that is mounted movably in the housing 20. In this example, the switch 22 is a multi-function keypad with buttons 24 (FIG. 3), which can be used for any vehicle functions. The switch 22 is connected to a cable 25 that extends out of the housing 20 and that is connected to a vehicle electronic system (not shown here) in order to transmit signals from the buttons 24 of the switch 22 to this electronic system. The part of the cable 25 that runs through the inside of the housing 20 is wound in a spiral shape in order to be able to compensate for the adjustment path of the switch 22.

Figure 3:
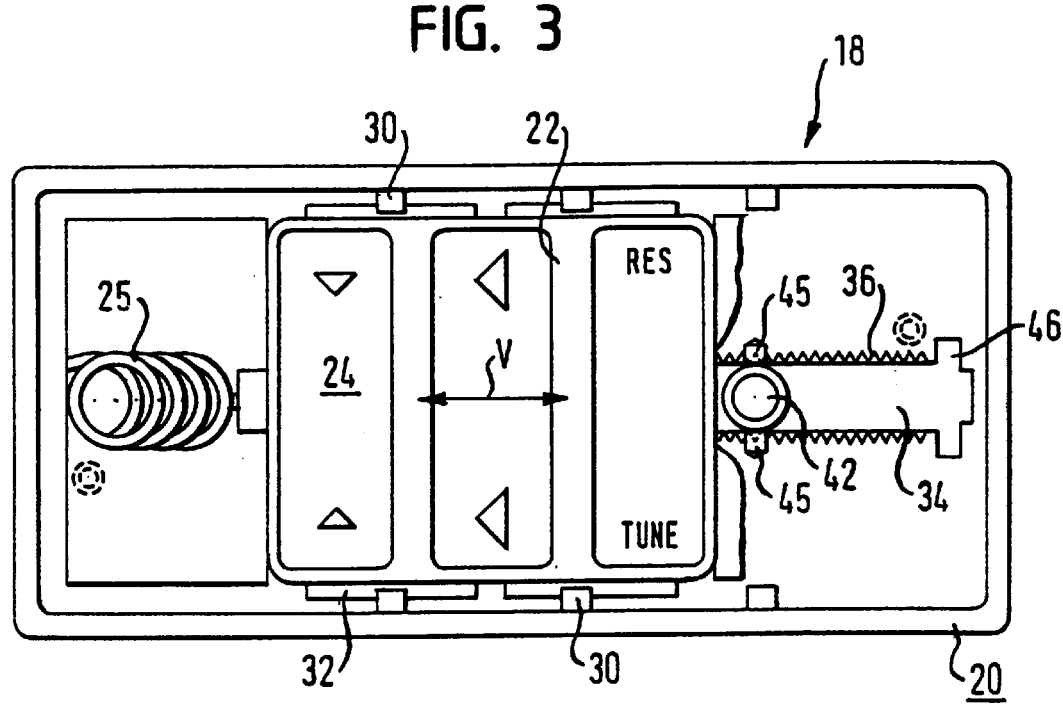
FIG. 3 is a schematic view of an assembly with a switch for use in a steering wheel according to the invention.
Figure 4:
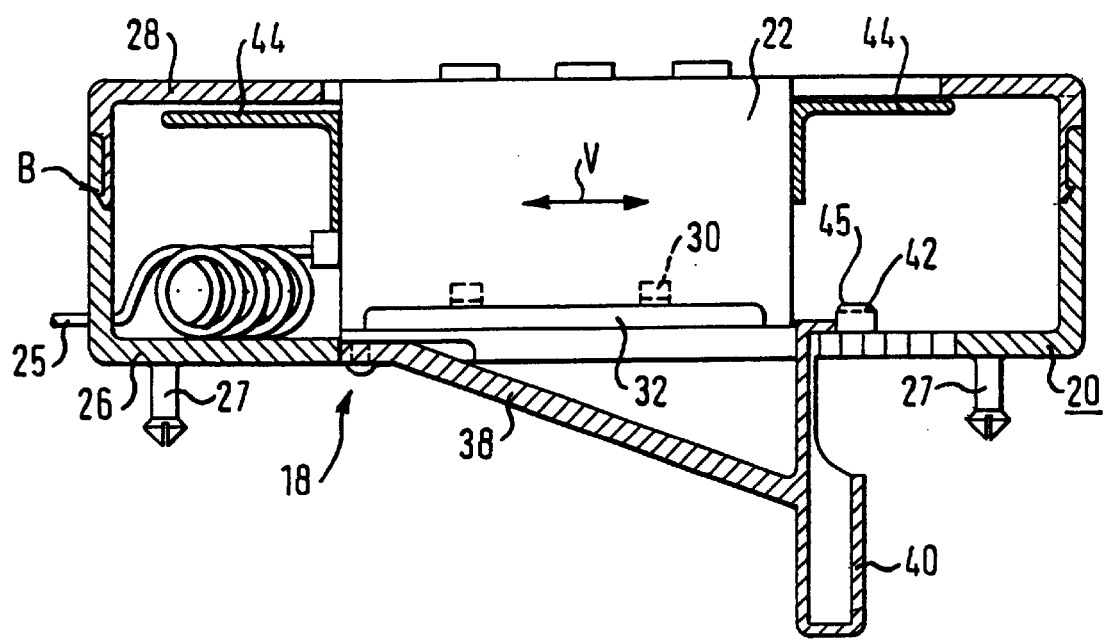
FIG. 4 is a sectional view of the assembly of FIG. 3.

FIGS. 3 and 4 show the switching unit 18 in greater detail. The housing 20 consists of a bottom part 26 and a cover part 28 which can be closed by a latching connection B to form the housing 20. Latching elements 27 are formed on the bottom part 26 and they can be used to latch the switching unit 18 to the steering wheel body 12.

The cover part 28 has an opening that is configured in such a way that the switch 22, which is located in the housing 20 and whose top preferably lies in a plane with the cover part 28, can be moved into any desired adjustment position. The lengthwise extent of the opening is coordinated with the adjustment path of the switch. For optical reasons and for protection against dirt and damage, panels 44 are situated on the switch 22. The panels 44 are configured in such a way that they in each case close the part of the opening in the cover part 28 that is not filled by the switch 22. The panels 44 can also be designed as bellows.

The switch 22 has tabs 32 that are accommodated between the bottom of the housing 20 and projections 30 that are formed on the underside of the bottom part 26. The bottom and the projections 30 form a linear guide in which the switch 22 is movably held. The projections 30 are arranged in the middle area of the bottom part 26 in such a way that the switch 22 can be simply inserted into the housing 20 as will still be described. The switch 22, regardless of its actual position, is always held by four projections 30.

In the bottom part 26, there is provided an elongated hole 34 whose lengthwise sides have a toothed structure 36. The lengthwise extent of the elongated hole 34 is coordinated with the length of the possible adjustment path of the switch 22.

The switch 22 is connected to a flexible bearing arm 38 which, in turn, has an adjustment element 40. A latching pin 42 is formed on the adjustment element 40. The latching pin 42 has teeth that create a form-fitting connection with the teeth of the toothed structure 36, as long as the bearing arm 38 is in a locked position.

The adjustment element 40 can be pressed into the housing 20 from above, i.e. transversely to the adjustment path V, as a result of which the latching pin 42 is released from the teeth of the toothed structure 36. The switch 22 is now brought into a traversing position. On the adjustment element 40, the switch 22 can be moved in the housing 20 until it reaches the desired position. When the adjustment element 40 is released, the bearing arm 38, due to its intrinsic elasticity, moves back into its initial position, the teeth of the latching pin 42 engaging the toothed structure 36 in a different place, thereby once again locking the switch 22. In order to ensure a defined vertical position of the adjustment element 40, a stop 45 made up of two lateral projections is provided on the latching pin 42 above the two latching teeth and projecting laterally beyond them, said stop 45 being in contact with the top of the bottom part 26 in the locked position.

The assembly of the switching unit 18 is simple and quick. First of all, the switching unit 18 is put together. For this purpose, in a first step, the switch 22 is put in place at one end of the bottom part 26. As can be seen in FIG. 3, the projections 30 and the tabs 32 are adapted to each other in such a way that the tabs 32 can first be guided past the projections, transversely to the adjustment direction, and can subsequently be slid between the bottom part 26 and the projections 30.

After the switch 22 has been arranged in its linear guide, the bearing arm 38 is attached to the switch 22, for example, by means of a screw. Then the switch 22 has to be slid once more onto the housing end with the elongated hole 34 at whose end there is a widened section 46. The latching pin 42 passes through the widened section 46, thus reaching the inside of the housing. Then the switch 22 is slid back to the middle of the housing, the latching pin 42 latching in the toothed structure 36 and affixing the switch 22 in the housing 20. Subsequently, the cover part 28 is placed onto the bottom part 26 and is latched to the latter in order to close the housing 20.

The prefabricated switching unit 18 can now be simply attached to the steering wheel body 12 in that it is inserted into a recess that is provided on the steering wheel body and is securely connected to the steering wheel body 12 by means of the latching elements 27.

As can be seen in FIG. 1, the foam covering 16 has an opening 48 through which the adjustment element 40 protrudes. The lengthwise extension of this opening 48 corresponds essentially to the maximum adjustment path of the switch 22.

A driver who grasps the steering wheel can grip the rear of the spoke 10 with one finger and can press the adjustment element 40 into the spoke. Now he/she can move the switch 22 to the desired position. As soon as the driver lets go of the adjustment element 40, the switch 22 latches into its new position.

What is claimed is:

1. A vehicle steering wheel comprising:
    a steering wheel body, and
    at least one electric switch attached to said steering wheel body,
    said switch, for adaptation to the length of the fingers of a driver, being adjustably attached to said steering wheel body in such a way that said switch can be displaced by said driver to assume various positions relative to said steering wheel body,
    wherein a detachable form-fitting connection is provided, which can be locked in any position of said switch, and wherein said form-fitting connection is a toothed structure that meshes with counter teeth on said switch.

2. The vehicle steering wheel according to claim 1, wherein said switch is mounted in such a way that said adjustment can be made by said driver without the use of a tool.

3. The vehicle steering wheel according to claim 1, wherein said switch is accommodated in a linear guide.

4. The vehicle steering wheel according to claim 3, wherein for mounting said switch it can be inserted into said linear guide transversely to an adjustment direction and is then held in said linear guide by being moved subsequently.

5. A vehicle steering wheel comprising:
    a steering wheel body, and
    at least one electric switch attached to said steering wheel body, said switch, for adaptation to the length of the fingers of a driver, being adjustably attached to said steering wheel body in such a way that said switch can be displaced by said driver to assume various positions relative to said steering wheel body, wherein a detachable form-fitting connection is provided, which can be locked in any position of said switch, wherein a part of said form-fitting connection that is associated with said switch can be moved transversely to said adjustment direction out of a locked position and into a traversing position, in which an adjustment of said switch is permissible, said part of said form-fitting connection associated with said switch being subsequently moved into another locked position.

6. A vehicle steering wheel comprising:

a steering wheel body, and at least one electric switch attached to said steering wheel body, said switch, for adaptation to the length of the fingers of a driver, being adjustably attached to said steering wheel body in such a way that said switch can be displaced by said driver to assume various positions relative to said steering wheel body, wherein an adjustment element is provided which is to be gripped on a rear side of said steering wheel, said adjustment element being connected to said switch and said switch being moved by means of said adjustment element.

7. The vehicle steering wheel according to claim 6, wherein a latching pin is formed on said adjustment element and forms a switch-side part of said form-fitting connection.

8. The vehicle steering wheel according to claim 7, wherein said adjustment element is connected to said switch via a flexible bearing arm and wherein said latching pin is brought out of a locked position and into a traversing position by bending said bearing arm.

9. The vehicle steering wheel according to claim 6, wherein said switch is designed as a multi-function keypad.

10. The vehicle steering wheel according to claim 1, wherein said switch is part of a switching unit configured as a prefabricated assembly having a housing which is rigidly attached to said steering wheel body and in which said switch is movably mounted.

11. The vehicle steering wheel according to claim 6, wherein said switch is attached to a spoke of said steering wheel body and can be moved lengthwise along said spoke.

12. A vehicle steering wheel comprising:

a steering wheel body, and at least one electric switch attached to said steering wheel body, said switch, for adaptation to the length of the fingers of a driver, being adjustably mounted on a spoke of said steering wheel body and can be moved lengthwise along said spoke while mounted on said spoke.

13. The vehicle steering wheel according to claim 12, wherein said switch is mounted in such a way that said adjustment can be made by said driver without the use of a tool.

14. The vehicle steering wheel according to claim 12, wherein said switch is accommodated in a linear guide.

15. The vehicle steering wheel according to claim 14, wherein for mounting said switch it can be inserted into said linear guide transversely to an adjustment direction and is then held in said linear guide by being moved subsequently.

16. The vehicle steering wheel according to claim 12, wherein a detachable form-fitting connection is provided, which can be locked in any position of said switch.

* * * * *

UNITED STATES PATENT AND TRADEMARK OFFICE
CERTIFICATE OF CORRECTION

PATENT NO. : 6,770,826 B2
DATED : August 3, 2004
INVENTOR(S) : Martin Kreuzer

It is certified that error appears in the above-identified patent and that said Letters Patent is hereby corrected as shown below:

Column 6,
Line 5, after "claim" change "1" to -- 6 --.

Signed and Sealed this

Fifteenth Day of March, 2005

JON W. DUDAS
*Director of the United States Patent and Trademark Office*